United States Patent [19]

Dixon

[11] 4,384,850
[45] May 24, 1983

[54] RECIRCULATING AIR HEATER
[75] Inventor: James M. Dixon, Farmington Hills, Mich.
[73] Assignee: Tri-Mark Metal Corporation, Detroit, Mich.
[21] Appl. No.: 274,436
[22] Filed: Jun. 17, 1981
[51] Int. Cl.³ .................. F27B 3/22; F27D 17/00; F27B 17/00
[52] U.S. Cl. .................... 432/72; 432/176; 432/177; 432/187; 432/223
[58] Field of Search ............... 432/72, 176, 177, 187, 432/223

[56] References Cited
U.S. PATENT DOCUMENTS

| 3,604,824 | 9/1971 | Hardison | 432/72 |
| 3,936,951 | 2/1976 | Haueise et al. | 34/35 |
| 4,040,477 | 8/1977 | Garberick | 432/223 |
| 4,098,567 | 7/1978 | Hubbert | 432/72 |
| 4,324,545 | 4/1982 | Hubbert | 432/72 |

Primary Examiner—John J. Camby
Attorney, Agent, or Firm—Barnes, Kisselle, Raisch, Choate, Whittemore & Hulbert

[57] ABSTRACT

A recirculating air heater for an oven is fired by a burner and connected with the oven by a return air duct and an outlet duct. The return air duct has two sets of louvers for admitting controlled amounts of return air to a combustion chamber and a burner bypass chamber in the oven. The combustion gases and return air in the combustion chamber are mixed and directed through a catalytic converter before being mixed with the return air in the burner bypass chamber and directed back into the oven. A portion of the gases directed through the catalytic converter are discharged to atmosphere and an equal amount of preheated fresh air is admitted to the heater. The inlet and exhaust ducts are provided with blowers and dampers so that the mass flow rates of fresh air and exhaust air are substantially equal. During oven preheating some of the combustion gases and heated return air are caused to bypass the catalytic converter and flow directly back into the oven.

10 Claims, 10 Drawing Figures

RECIRCULATING AIR HEATER

This invention relates to a recirculating air heater for work processing ovens, such as a paint drying oven.

Conventional work processing ovens use heated air as the processing medium. In order to conserve energy, the air is recirculated between the oven and an oven heater. A fuel burner heats the recirculating air to a desired elevated temperature and, to further conserve energy, the burner is located directly in the air flow path. Thus, the recirculating heated air becomes contaminated with products of combustion. In some processing operations the air in the oven also becomes contaminated. In a paint drying oven, for example, the air contains a substantial amount of volatiles evaporated from the drying paint. Therefore, to reduce the contaminants in the recirculating air and to avoid the accumulation of an explosive mixture in a paint oven, it becomes necessary to remove a substantial portion of the contaminants and other combustibles from the air in the heater before it is returned to the oven. The contaminated air is usually cleaned by directing it through a catalytic converter. This tends to reduce the oxygen content of the air. For this reason, and sometimes for other reasons as well, it is necessary to exhaust a portion of the recirculating air to atmosphere and replenish the exhausted air with fresh air.

Heaters of the above described type are conventional. One such heater is shown in U.S. Pat. No. 4,098,567. Such prior art heaters have several deficiencies. The fresh air admitted to the system from the outside atmosphere tends to substantially reduce the temperature of the recirculating air thereby requiring the addition of a substantial amount of heat by the burner. Likewise, air is exhausted from the system into the atmosphere at substantially the temperature of the oven and this also represents a loss of valuable heat. In many ovens the processing chamber frequently communicates with the surrounding atmosphere through openings which accommodate a conveyor for the products being processed. As a result, unless the mass flow rate of the fresh air admitted to the system is substantially equal to the mass flow rate of the exhausted air, the pressure in the oven will be either above or below atmospheric and will result in either contaminated oven air being discharged into the surrounding room atmosphere or will cause the room temperature air to be sucked into the hot oven.

The primary object of this invention is to provide a recirculating air heater that is efficient in operation, especially from the standpoint of energy consumption.

A further object of the invention is to provide a heater of the type described provided with means to insure that the mass flow rates of the fresh air admitted and the exhausted air are substantially equal so that the pressure in the oven will be in substantial equilibrium with the surrounding room air.

Another object of the invention is to provide an oven of the type described wherein means are provided for directing return air through the heater during start up of the oven so that the oven is heated to its operating temperature in a minimum of time while at the same time insuring that the catalytic converter operates efficiently at its rated capacity.

The invention also has for its object the conservation of energy by conducting the fresh air introduced into the system through one section of a heat exchanger and directing the exhaust air through the other section of the heat exchanger so as to preheat the fresh air and simultaneously supply pre-heated air to the burner.

Another important object of the invention is to insure that the air exhausted from the system to atmosphere has been substantially cleaned of contaminants and combustibles so as to avoid pollution of the surrounding atmosphere.

Another object of the invention is to provide a control arrangement for a recirculating air heater that insures that its operation will be automatic, safe and efficient.

In general, the heater of the present invention comprises an insulating housing divided internally into several chambers for conducting the recirculating air, the fresh air and the exhaust air through predetermined paths so as to result in efficient operation of the heater. An inner combustion chamber in the housing is separated from and surrounded at least in part by an outer burner bypass chamber by side walls and by a catalytic converter unit forming an end wall of the combustion chamber. On the downstream side of the catalytic converter unit there is provided a mixing chamber into which the air passing through the catalytic converter and the bypass chamber are mixed and directed back into the oven by means of a blower. An automatically controlled damper in the return air duct to the heater directs the return air from the oven to the combustion chamber and to the bypass chamber in desired relative amounts in response to the temperature in the combustion chamber at the inlet side of the catalytic converter. The burner chamber also communicates with the mixing chamber through a damper-controlled bypass passageway which is automatically operated so as to bring the oven up to its operating temperature in a minimum of time and which simultaneously avoids inefficient operation of the catalytic converter as a result of directing too much contaminated air therethrough. The fresh air inlet duct and the exhaust duct for the heater are both provided with blowers and dampers so that the mass flow rates of the air admitted into and exhausted from the system can be precisely controlled. The exhaust air duct extends from the downstream side of one section of the catalytic converter to a heat exchanger through which the fresh air is introduced into the system. The fresh air duct from the heat exchanger divides into two damper-controlled paths, one leading to the return air bypass chamber in the heater and the other extending to the burner itself so as to supply the burner with pre-heated air.

Other objects, features and advantages of the present invention will become apparent from the following description and accompanying drawings, in which:

Figure 1:
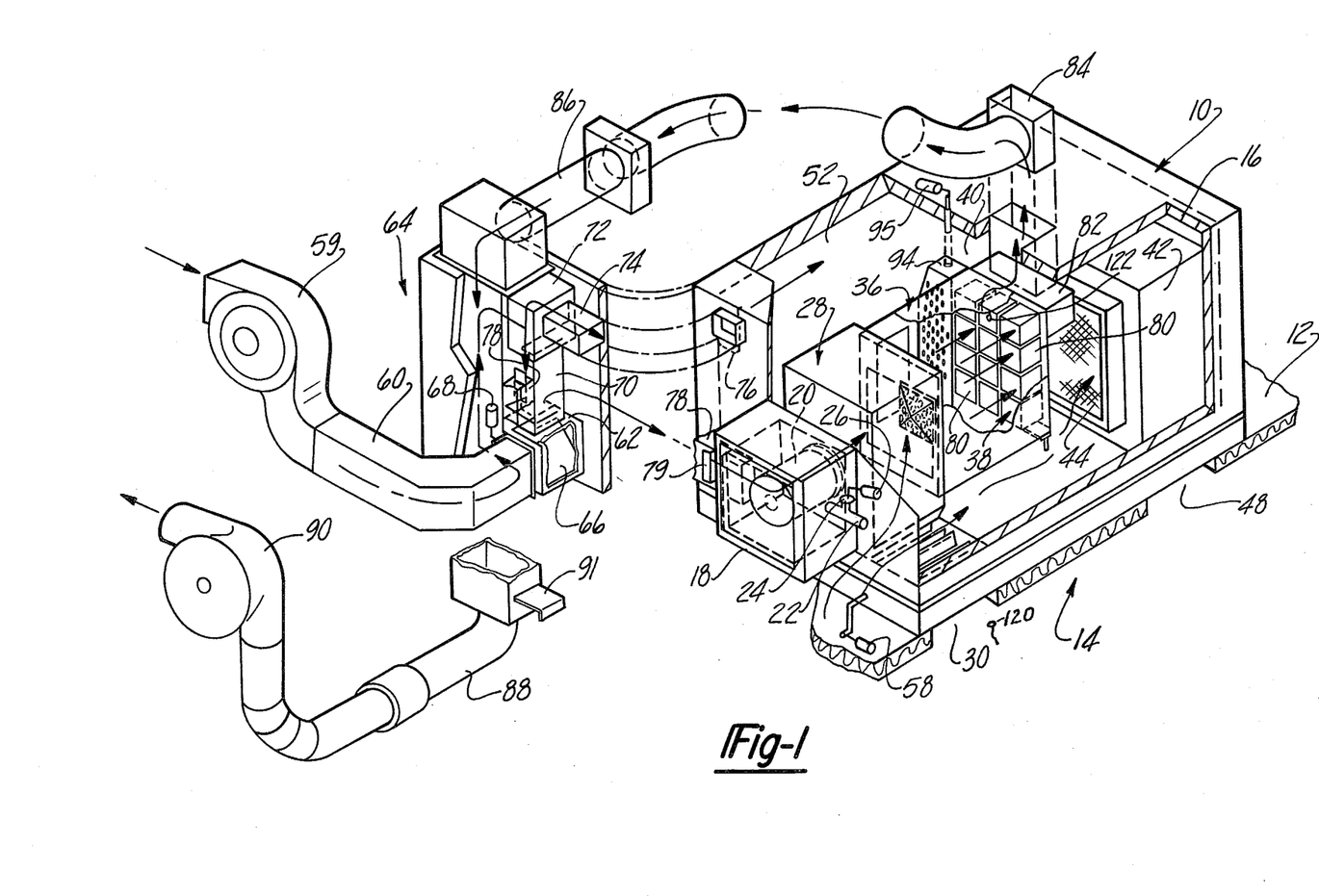
FIG. 1 is a perspective view of a heater in accordance with the present invention with portions removed and with the heat exchanger shown rotated 90° out of position for purposes of illustration.
Figure 3:
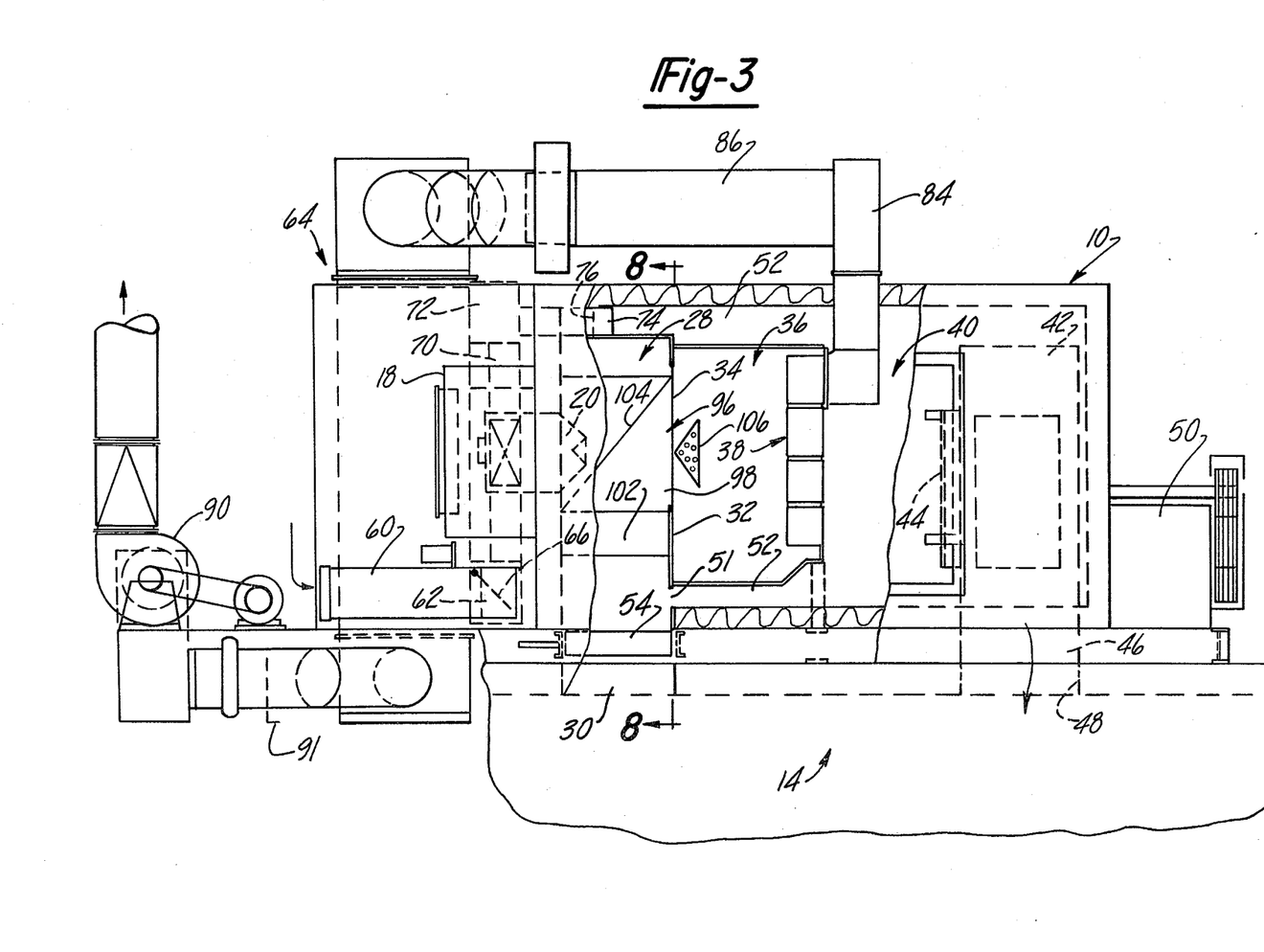
FIG. 3 is a side elevational view of the heater with portions removed.
Figure 4:
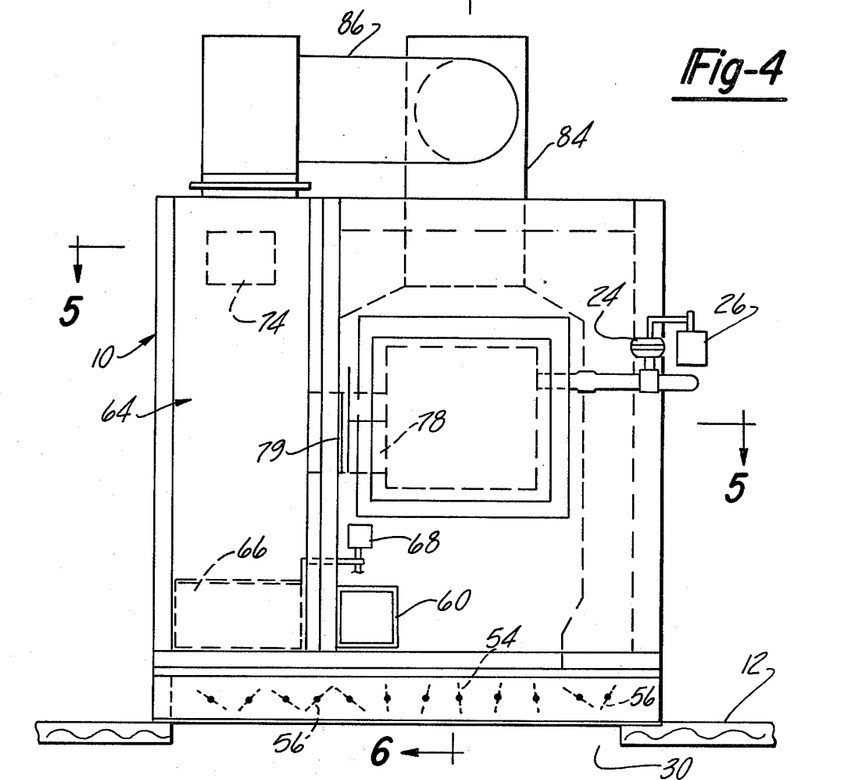
FIG. 4 is an elevational view of the burner end of the heater.
Figure 8:
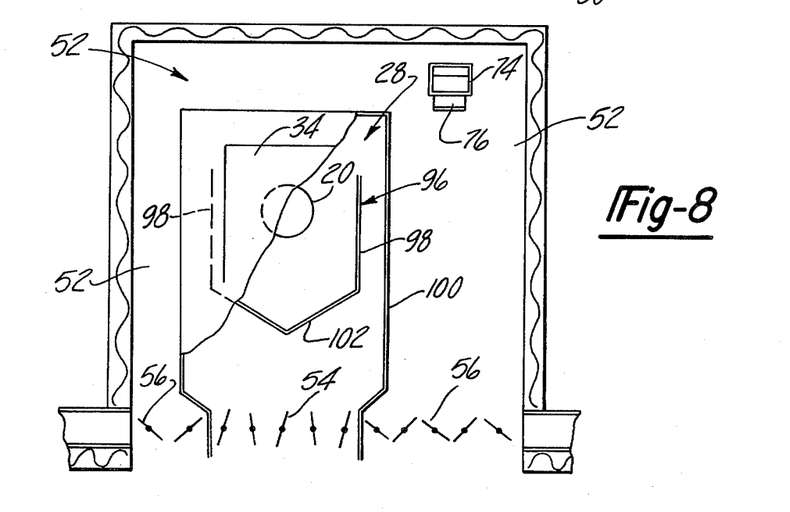
FIG. 8 is a sectional view taken generally along the line 8—8 in FIG. 3.

Referring to FIG. 1, the heater comprises a housing 10 which, for convenience, is shown mounted on the top insulated wall 12 of a processing oven 14. The exterior walls of housing 10 are all insulated, as at 16, so that a minimum of heat is radiated therefrom. At one end of housing 10 there is mounted a casing 18 which houses a fuel burner 20 supplied with fuel through a conduit 22 having a valve 24 therein controlled by a motor 26. The outlet of burner 20 projects into a combustion chamber 28 formed with sheet metal walls. The lower end of combustion chamber 28 is open as indicated in FIGS. 3 and 8 and communicates with a return air duct 30 from oven 14. A partition in combustion chamber 28 spaced from burner 20 is formed with an outlet opening 34 which communicates with a catalytic chamber 36. The downstream end of chamber 36 is closed by a catalytic converter unit 38 which separates chamber 36 from a mixing chamber 40 at the end of housing 10 opposite the burner 20. Within chamber 40 there is arranged a centrifugal fan 42 having an axial inlet 44 and a radial outlet 46 (FIG. 3) which communicates with the inlet duct 48 to oven 14. The impeller of blower 42 is belt driven from a motor 50.

Figure 2:
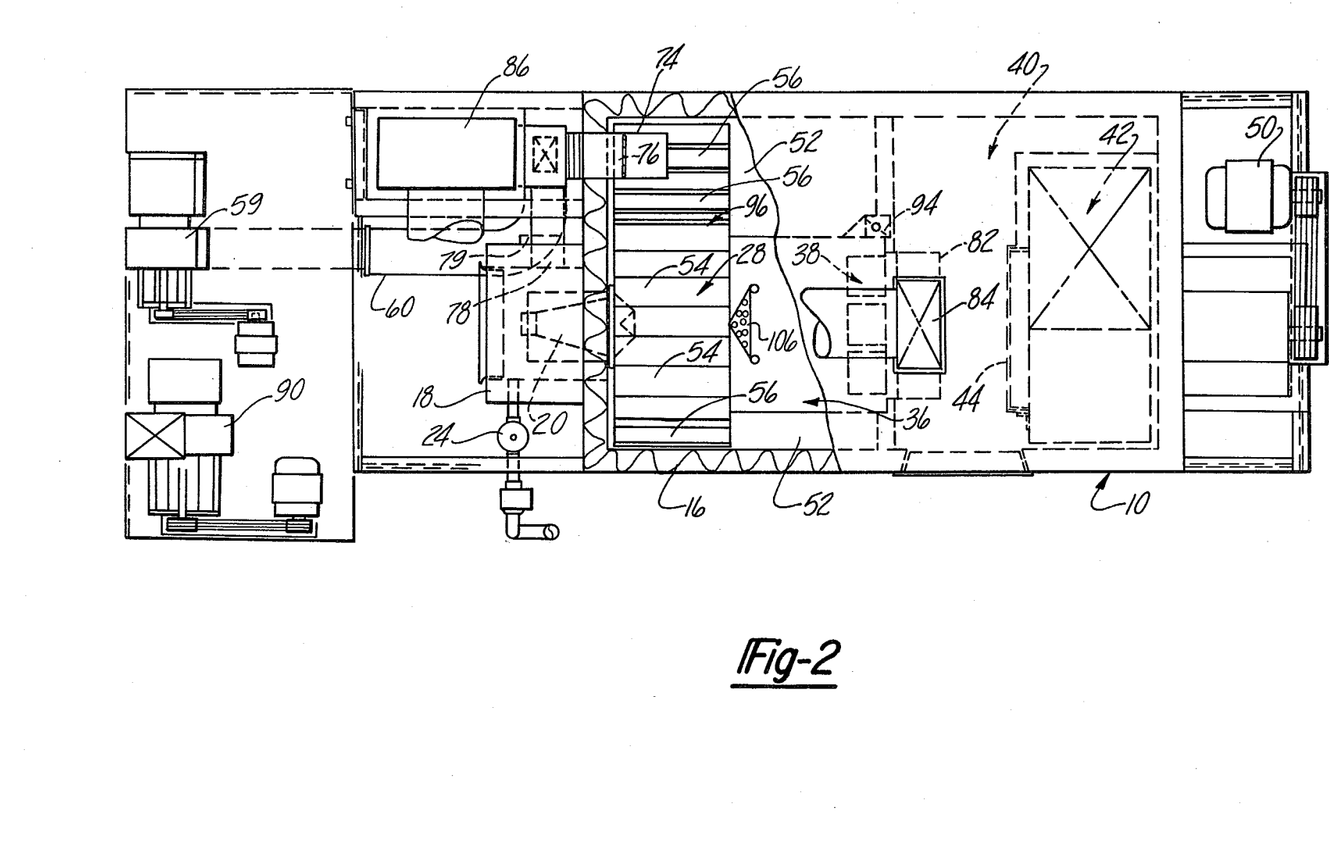
FIG. 2 is a top plan view of the heater with portions removed.

As shown in FIGS. 2, 3 and 8, the side walls and the top wall of combustion chamber 28 are spaced inwardly from the top and side walls of housing 10. Likewise the top and bottom walls, as well as the side walls, of catalytic chamber 36 are spaced inwardly from the top and bottom walls and the side walls of housing 10. The spaces between these walls form a bypass chamber 52 which, at the downstream end thereof, communicates directly with mixing chamber 40. Return air duct 30 from oven 14 communicates with the lower end of bypass chamber 52 at the opposite sides of combustion chamber 28 and through openings 51 at the lower end of partition 32 (FIG. 3). The communication between return air duct 30 and combustion chamber 28 on the one hand and the portion of bypass chamber 52 at each side of combustion chamber 36 on the other is controlled by two sets of dampers 54,56 (FIG. 8). These two sets of dampers are interconnected for operation in unison by a motor 58 (FIG. 1). The two sets of dampers are interconnected so that they are oriented 90° relative to one another. Thus, when one set of dampers is rotating toward the open position, the other set of dampers is rotating toward the closed position.

Fresh air is admitted to the system by a blower 59, the outlet of which is connected by a duct 60 to the inlet chamber 62 at the lower end of a heat exchanger 64. A damper 66 in chamber 62 operated by a motor 68 directs air into the lower end of heat exchanger 64 in one position and in another position thereof directs the fresh air upwardly through a vertical duct 70 to bypass the heat exchanger. The upper end of duct 70 communicates with the fresh air outlet 72 of heat exchanger 64. A duct 74 extends from outlet 72 through the adjacent end wall of housing 10 so that its outlet communicates with bypass chamber 52 (FIG. 8). A manually controlled damper 76 in duct 74 is provided for controlling the flow of air through the duct into chamber 52. Another duct 78 extends from the vertical duct 70 to burner casing 18 for admitting fresh air to burner 20. Duct 78 is controlled by a manual damper 79. The operation of motor 68 is controlled by a conveyor (not illustrated) in the oven. When the conveyor is running damper 66 is positioned by motor 68 so that all the fresh air admitted to the system through blower 59 is directed upwardly through heat exchanger 64 into chamber 72. A portion of the heated fresh air is directed through duct 74 into bypass chamber 52 and another predetermined portion of the heated fresh air is directed downwardly through vertical duct 70 and through duct 78 to supply preheated combustion air to burner 20. When the conveyor is stopped damper 66 is positioned so that the heat exchanger is bypassed and all of the fresh air is directed upwardly through duct 70 to the burner 20 through duct 78 and to bypass chamber 52 through duct 74.

Catalytic converter 38 comprises a bank of rectangular catalytic converter blocks 80 arranged in horizontal and vertical rows so as to form a wall closing the downstream end of catalytic converter chamber 36. In the arrangement illustrated the upper row of blocks 80 on the outlet side thereof communicate directly with a manifold 82 connected by hot air exhaust ducts 84,86 with the upper end of the exhaust section of heat exchanger 64. Heat exchanger 64 is of a conventional type so that the hot air exhausted through duct 86 is in heat exchange relation with the fresh air directed into the heat exchanger through duct 60. The hot air exhaust passageway at the lower end of heat exchanger 64 extends downwardly to an exhaust duct 88 which extends to the inlet of a blower 90. The flow of air through duct 88 is adapted to be adjusted by a manual damper 91.

Figure 5:
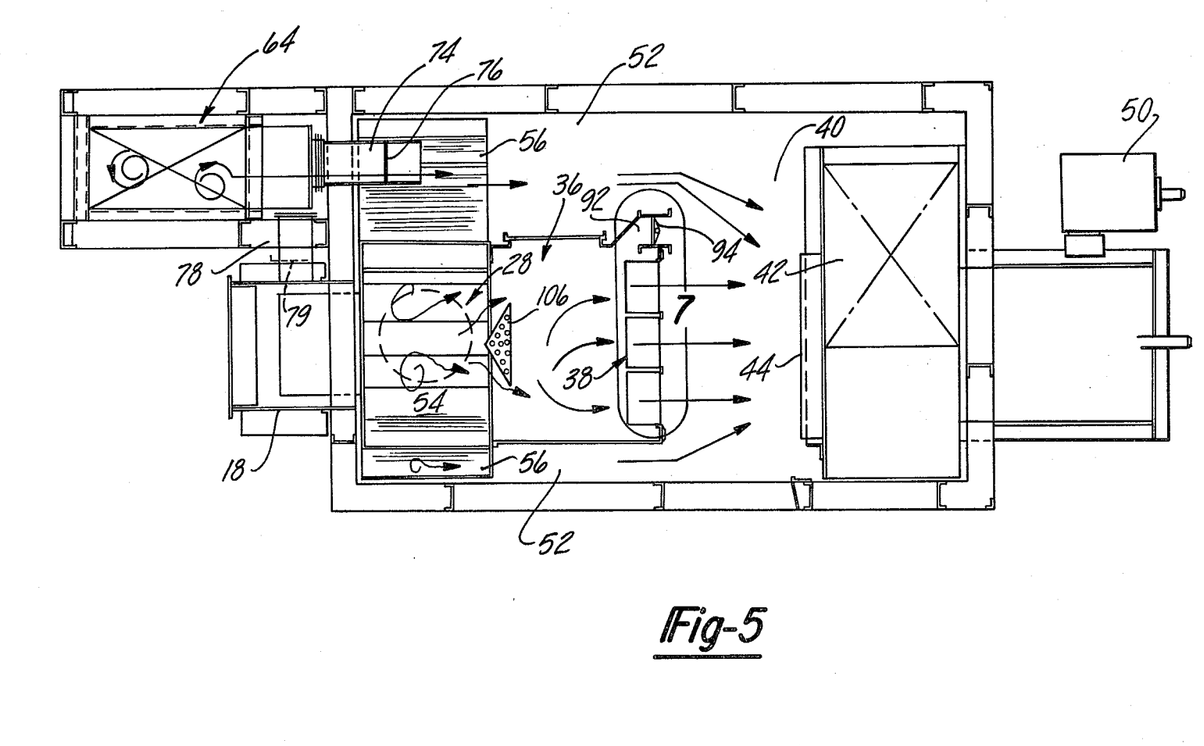
FIG. 5 is a sectional view along the line 5—5 in FIG. 4.

Referring specifically to FIGS. 1 and 5, there is arranged adjacent one vertical end of catalytic converter unit 38 a bypass chamber 92. The inlet of chamber 92 communicates with the interior of catalytic chamber 36 and the outlet thereof communicates with mixing chamber 40. The flow of air or gas through bypass chamber 92 is controlled by a damper 94 which is operated automatically by a motor 95. The automatic operation of damper 94 to bypass hot air or gas around catalytic converter unit 38 will be described hereinafter.

Figure 6:
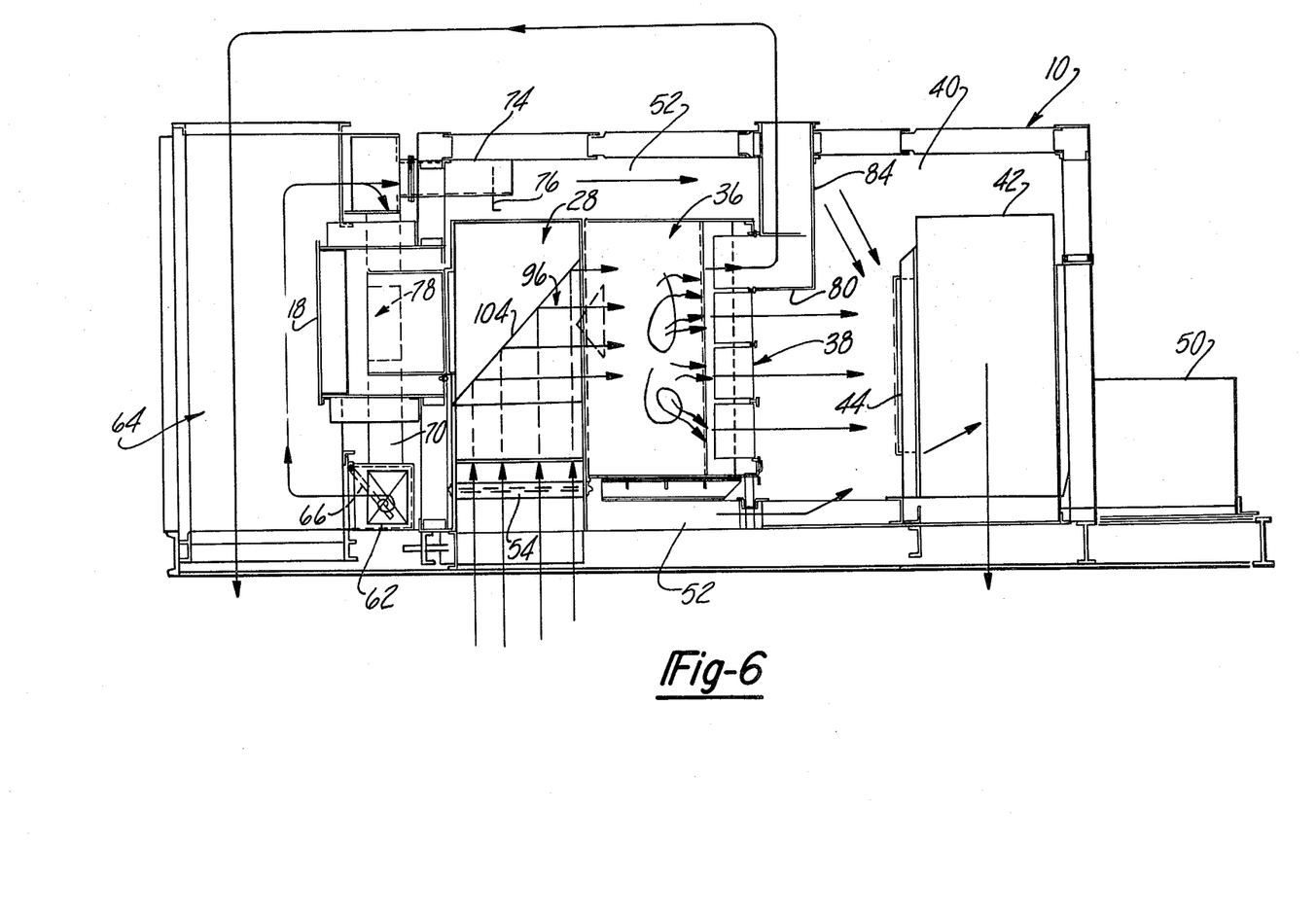
FIG. 6 is a sectional view along the line 6—6 in FIG. 4.

Referring now to FIGS. 3, 6 and 8, within combustion chamber 28 there is mounted a generally U-shaped baffle 96 which extends between the opposite end walls of the combustion chamber. The side walls 98 of baffle 96 are spaced laterally inwardly from the side walls 100 of combustion chamber 28 and the bottom wall 102 of baffle 96 is generally V-shaped in cross section (FIG. 8) and extends downwardly below the lower end of the outlet opening 34 of combustion chamber 28. As shown in FIGS. 3 and 6, the side walls 98 of baffle 96 have their upper edges 104 inclined downwardly from the downstream to the upstream edge of the baffle. In addition, as shown, a rectangular pyramidal distributor plate 106 is mounted in catalytic chamber 36 adjacent the outlet opening 34 of combustion chamber 28 in axial alignment with burner 20. In FIGS. 1, 2 and 5 combustion chamber 28 is illustrated with baffle 96 removed to better illustrate the arrangement of louvers 54,56.

Baffle 96 in combustion chamber 28 and the perforated distributor plate 106 are highly desirable to insure a thorough mixing of the return air introduced to the combustion chamber with the products of combustion of burner 20. As shown in FIG. 6, the air moving upwardly through louvers 54 is deflected by baffle 96 so that the length of travel of the path of this air is substantially constant with respect to the air admitted to the combustion chamber adjacent its upstream end and the air admitted to the combustion chamber adjacent its downstream end. Adjacent the upstream end of combustion chamber 28 the return air travels a relatively short vertical distance around baffle 96 before it reaches the inclined edge 104 and then travels a relatively long horizontal distance to the catalytic chamber 36. At the same time the distributor plate 106 tends to deflect the products of combustion away from a straight axial flow path. Thus baffle 96 and distributor plate 106 insure a thorough mixing of the return air with the products of combustion in the catalytic chamber 36 so that the catalytic unit 38 will operate at substantially the same temperature throughout its entire area.

Figure 7:
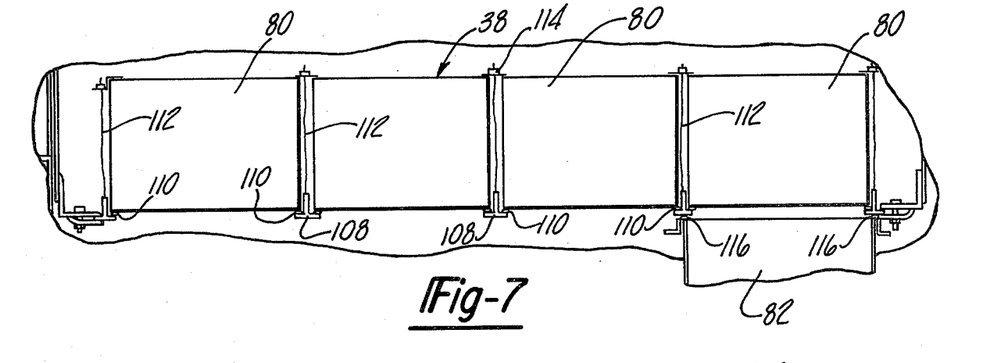
FIG. 7 is an enlarged plan view of the portion in FIG. 5 designated 7.

Referring to FIG. 7, the catalytic converter blocks 80 are mounted in a frame formed of T bars 108 which are spaced apart to receive the blocks 80 therebetween. The peripheral edges of the catalytic converter blocks 80 on the exit side thereof are sealed against the flanges of T bars 108 by suitable gaskets 110 and the blocks themselves are clamped against the T bars by means of threaded studs 112 provided with nuts and washers 114 on the inlet side of the catalytic converter blocks 80. The pressure differential across the catalytic unit 38 tends to increase the sealing effect of gaskets 110. Likewise, the exhaust manifold 81 is in sealed relation with the upper row of catalytic converter blocks 80. The manifold 82 may be welded to the upper T bars 110 or, as shown in FIG. 7, simply sealed against these T bars by means of gaskets 116. The sealed connection between exhaust manifold 82 and the upper row of catalytic blocks 80 insures that the exhaust air is cleaned before being discharged to atmosphere.

The control system for the heater can be either electrical or pneumatic. In either event the control system includes a first temperature sensor 120 (FIG. 1) for sensing the temperature in the oven and a second temperature sensor 122 positioned on the inlet side of the catalytic converter unit 38. Two conventional temperature controllers (not illustrated) are provided; one of the temperature controllers is operatively connected to temperature sensor 120 and the other is operatively connected with temperature sensor 122. The temperature controller associated with sensor 120 operates motor 26 for controlling the amount of fuel admitted to burner 20. Thus, when the oven temperature is below a predetermined value, motor 26 opens valve 24 for admitting more fuel to the burner, and, when the oven temperature exceeds the desired operating temperature, the amount of fuel admitted to the burner 20 is decreased. The temperature controller associated with sensor 122 operates motor 58 that controls the opening and closing of dampers 54,56 which admit return air to combustion chamber 28 and burner bypass chamber 52. The two temperature controllers are also connected into a common circuit which operates motor 95. Motor 95 is operated to open the damper 94 in the catalytic bypass chamber 92 when sensor 122 causes dampers 54 to be positioned at a predetermined wide open position if, at the same time, sensor 120 causes motor 26 to open valve 24 so that the burner 20 is operating at its high fire condition. By reason of this control arrangement damper 94 opens only when the temperature controller associated with sensor 120 calls for maximum heat and, at the same time, the temperature controller for sensor 122 calls for a maximum of volume of air to the combustion chamber 28.

When the oven is initially operated from a cool condition sensor 120 is substantially below the predetermined oven operating temperature and, therefore, the temperature controller associated with sensor 120 will call for maximum heat thereby causing motor 126 to open valve 24 and cause the burner 20 to operate at high fire condition. At the same time, temperature sensor 122 will indicate a temperature substantially below the desired operating temperature at the catalytic converter and the temperature controller associated therewith will operate motor 58 so as to admit a minimum amount of return air through louvers 54 to combustion chamber 28 and a maximum amount of air through louvers 56 to the burner bypass chamber 52. After a relatively short period of time, for example, five minutes, the mixture of return air and combustion gases in chamber 36 will have reached the desired predetermined operating temperature of the catalytic converter unit 38 and the temperature controller associated with sensor 122 will have operated motor 58 to rotate louvers 54 to a relatively wide open position. At this time burner 20 is operating at high fire and the very large amount of air being directed through the catalytic converter unit 38 will be in excess of that for which it was designed. This not only results in inefficient operation of the heat exchanger, but also produces a substantial pressure drop across catalytic converter unit 38. Since only a relatively small amount of return air is being directed to burner bypass chamber 52 at this time, the inlet 44 of blower 42 will be starved for air. When this condition occurs, that is, burner 20 operating at high fire and louvers 54 being relatively wide open, the temperature controllers associated with sensors 120,122, through conventional circuitry, will cause motor 95 to open damper 94 and thereby permit a substantial amount of high temperature gas and air to bypass the catalytic converter unit 38 through bypass passageway 92. As a result, the oven reaches its operating temperature in a minimum period of time and the catalytic converter is allowed to operate efficiently during oven pre-heat conditions. However, as soon as the oven approaches its operating temperature, motor 26 will start to close valve 24 so that burner 20 then operates at a condition below high fire. When this occurs the control circuit of the two temperature controllers will automatically close damper 94 and all of the air in the combustion chamber will then be directed through the catalytic converter unit 38. Since the heat generated by the burner is now substantially less than at high fire, it requires much less hot return air to the combustion chamber to maintain the catalytic converter at its designed operating temperature. Therefore, louver 54 will modulate to admit less air to the combustion chamber. At the same time valve 24 will modulate at a medium fire condition in accordance with the oven temperature.

In operating an oven heater unit of this type it is necessary to exhaust a certain percentage of the recirculating air to atmosphere and replenish the exhausted air with fresh air. In the present arrangement all of the air exhausted from the system is that which has been directed through the upper row of catalytic blocks 80. This air is, therefore, relatively clean. However, in order to maintain the oven at a pressure in equilibrium with the surrounding room atmosphere, the mass flow rate of fresh air must be substantially equal to the mass flow rate of the exhausted air. Blowers 59 and 90 are selected to have a capacity that will satisfy the fresh air requirements of the system. Conventional instrumentation is employed for measuring the mass air flow rates in the inlet duct 60 and the outlet duct 88. These flow rates are equalized by the adjustment of dampers 76 and 79 on the one hand and damper 91 on the other. These damper adjustments are made after the oven has reached operating temperature so that the mass flow air rates of the inlet and exhaust air are substantially stable under normal operating conditions. Return air duct 30 is sized such that, when the oven reaches its operating temperature, the pressure within the oven is not substantially affected by the slight modulation of louvers 54,56.

When it is desired to clean the exhaust section of the heat exchanger 64 illustrated in FIG. 1 damper 66 is positioned to cause the fresh air to bypass the heat exchanger and to flow directly to combustion chamber 18 and burner bypass chamber 52. Thus, the hot exhaust air will be directed through the heat exchanger without being cooled by the incoming fresh air. In an installation where the oven operating temperature is about 400° to 450° F. the air exhausted through manifold 82 will, under normal operating conditions, be at a temperature of about 750° to 800° F. At this temperature any solid combustibles accumulating in the exhaust section of the heat exchanger will be incinerated.

Figures 9, 10:
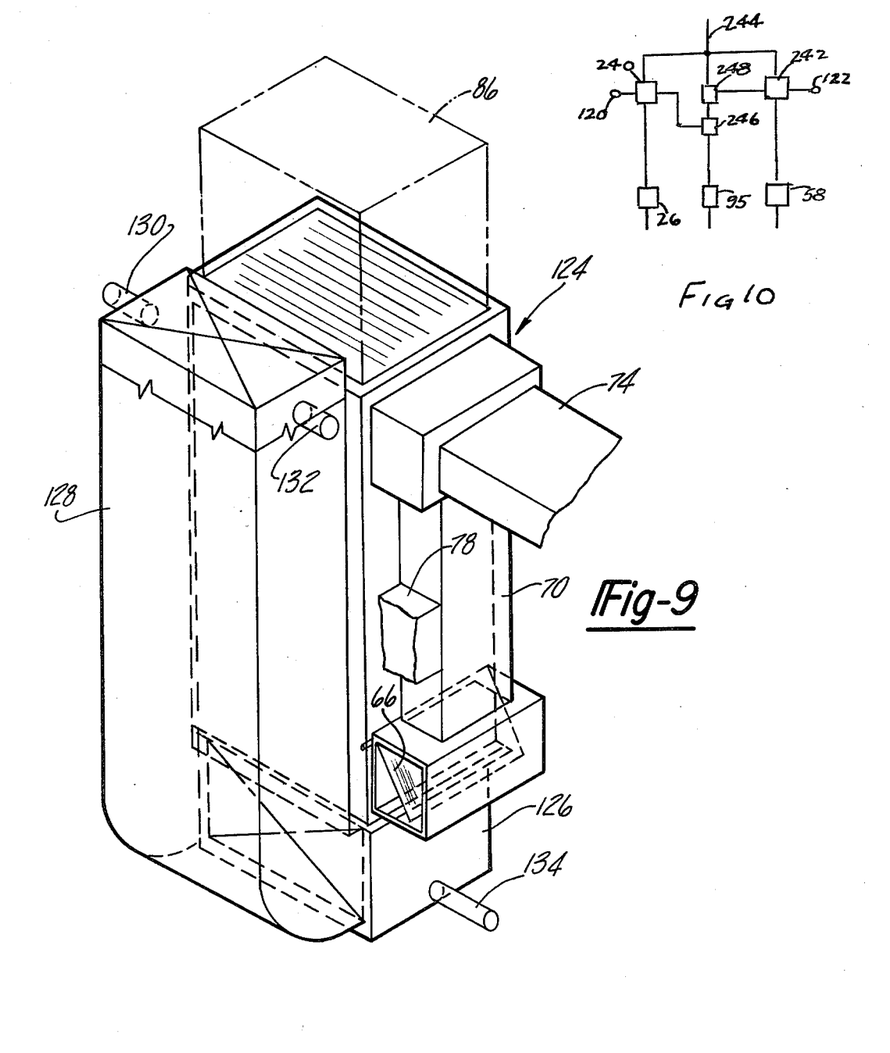
FIG. 9 is a perspective view of a modified form of heat exchanger usable with the heater.
FIG. 10 is a simplified circuit diagram of a control mechanism for the heater.

The modified form of heat exchanger illustrated in FIG. 9 is designed so that it can be cleaned with a cleaning solution, a caustic solution for example, instead of by hot exhaust gases. The heat exchanger 124 shown in FIG. 9 differs from heat exchanger 64 in that the hot air exhaust at the lower end of the heat exchanger discharges into a chamber 126 connected to the exhaust blower 90 through an upwardly extending, liquid-tight duct 128. Adjacent its upper end duct 128 is provided with a cleaning solution inlet 130 and an overflow pipe 132. Overflow pipe 132 is located at a height just slightly below the upper end of the exhaust air section of the heat exchanger. Chamber 126 is provided with a drain 134 at the lower end thereof.

When it is desired to clean the exhaust section of the heat exchanger shown in FIG. 9 the operation of the heater is interrupted and cleaning solution is introduced to duct 128 through inlet 130. The exhaust section of the heat exchanger becomes filled with the cleaning solution throughout the entire height thereof when the level in duct 128 reaches overflow 132. After the solution has remained in the heat exchanger the desired time period, the valve controlling drain 134 is opened and all of the solution in the heat exchanger and duct 128 is drained. Thereafter the valves controlling overflow 132 and drain 134 are closed and operation of the heater and oven can be reinitiated.

As previously indicated, any suitable electrical or fluid control circuit can be utilized to control operation of the dampers and the burner. For the reasons previously pointed out, the circuit must have the capability of opening bypass damper 94 only when the burner is operated at high fire and simultaneously damper 54 is relatively wide open. A simplified circuit for such purpose is shown diagrammatically in FIG. 10. The two temperature controllers 240,242 are connected in parallel with the power source line 244. Controller 240 is responsive to the temperature sensed by sensor 120 and controller 242 is responsive to the temperature sensed by sensor 122. Controller 240 operates burner gas valve motor 26 and controller 242 operates motor 58 for damper 54. When the temperature of sensor 120 causes the burner to operate at high fire, controller 240 actuates valve 246. When the temperature of sensor 122 causes motor 58 to open damper to a predetermined wide open portion, controller 242 actuates valve 248 connected in series with valve 246. When both valves 246,248 are actuated, a circuit is closed to motor 95 which opens bypass damper 94. If the control circuit is fluid operated, valves 246,248 can be in the nature of manually adjustable relief valves and controllers 240, 242 can be conventional air operated temperature controllers, such as those sold by Minneapolis-Honeywell Corporation, stock number 425 PIB-93-274-66. If the temperature controllers 240,242 are electrically operated, then valves 246,248 can be in the nature of relay switches.

I claim:

1. In a recirculating air heater for a processing oven having a hot air inlet and an outlet for contaminated air, the combination comprising, a heater housing through which the oven air is recirculated, said housing having an upstream inlet connected to the oven outlet by a return air duct and having a downstream outlet connected to the oven inlet for directing heated air back into the oven, a combustion chamber in said housing communicating with said inlet to receive the return air from the oven, a fuel burner in said combustion chamber for heating said return air, damper means for controlling the volume of return air admitted to the combustion chamber from said return air duct, said combustion chamber having a downstream end, a catalytic converter in said combustion chamber at the downstream end thereof and disposed so that the heated air-gas mixture in the combustion chamber is caused to flow through the catalytic converter to remove the unburned contaminants from the mixture, said housing having a mixing chamber on the outlet side of said catalytic converter, said housing also having a burner bypass chamber extending from said return air duct to said mixing chamber so that the return air flowing through the bypass chamber is mixed in said mixing chamber with the air directed through the catalytic converter, a blower in said mixing chamber for directing the air therein back into the oven through said downstream housing outlet, fresh air inlet duct means extending into said housing, blower means for admitting fresh air to said inlet duct means, said inlet duct means comprising the sole means for supplying fresh air to the heater, exhaust air duct means extending from a portion of the outlet side of said catalytic converter to the outside atmosphere so that one portion of the air flowing through the converter is directed into the exhaust air duct means and another portion is directed to said mixing chamber, blower means for exhausting air from said exhaust duct means and adjustable damper means associated exclusively with said inlet and exhaust duct means for producing substantially equal mass flow rates of the air admitted to and exhausted from the heater to thereby maintain the pressure in the oven in substantial equilibrium relation with the surrounding atmosphere.

2. The combination called for in claim 1 wherein the exhaust duct means is connected in sealed relation with said portion of the outlet side of the catalytic converter.

3. The combination called for in claim 1 wherein said inlet duct means includes a first duct downstream from the inlet air blower extending to the heater housing exteriorly of the combustion chamber and a second duct downstream from the inlet air blower extending to said burner, said damper means including a damper in each of said ducts.

4. In a recirculating air heater for a processing oven having a hot air inlet and an outlet for contaminated air, the combination comprising, a heater housing through which the oven air is recirculated, said housing having an upstream inlet connected to the oven outlet by a return air duct and having a downstream outlet connected to the oven inlet for directing heated air back into the oven, a combustion chamber in said housing communicating with said inlet to receive the return air from the oven, a fuel burner in said combustion chamber for heating said return air, damper means for controlling the volume of return air admitted to the combustion chamber from said return air duct, said combustion chamber having a downstream end, a catalytic converter in said combustion chamber at the downstream end thereof and disposed so that the heated air-gas mixture in the combustion chamber is caused to flow through the catalytic converter to remove the unburned contaminants from the mixture, said housing having a mixing chamber on the outlet side of said catalytic converter, said housing also having a burner bypass chamber extending from said return air duct to said mixing chamber so that the return air flowing through the bypass chamber is mixed in said mixing chamber with the air directed through the catalytic converter, a blower in said mixing chamber for directing the air therein back into the oven through said downstream housing outlet, a passageway extending from the combustion chamber to said mixing chamber and bypassing the catalytic converter, and damper means for opening and closing said catalytic converter bypass passageway.

5. The combination called for in claim 4 including a control means for modulating the burner to operate between predetermined high and low fire conditions, said burner control means including a temperature sensor for the return air from the oven, a second temperature sensor for sensing the temperature of the air-gas mixture in said combustion chamber adjacent said catalytic converter, means for operating said first-mentioned damper means and control means interconnecting the second temperature sensor with the damper operating means to increase the amount of return air directed to the combustion chamber when the temperature sensed by the second temperature sensor falls below a predetermined value and decrease the amount of return air directed to the combustion chamber when the temperature sensed by the second temperature sensor exceeds said predetermined value.

6. The combination called for in claim 5 wherein said burner control means is adapted to modulate the burner to said high fire condition when the temperature of the return air from the oven is below a predetermined low value and including means interconnecting said two control means to open the damper means in the catalytic converter bypass passageway only when the damper means for controlling the amount of return air directed into the combustion chamber are opened to a predetermined large extent and at the same time the burner is operating at high fire condition.

7. In a recirculating air heater for a processing oven the combination comprising, an insulated heater housing, means for connecting the heater housing in an air recirculation path with the oven, said means including a return air duct from the oven extending to one end of the housing and a hot air outlet to the oven adjacent the opposite end of the housing, a combustion chamber in the housing communicating at the lower end thereof with the return air duct, a fuel burner in said combustion chamber for heating the return air directed to the combustion chamber, said housing also having a burner bypass chamber therein which also communicates at one end thereof with the return air duct, said combustion chamber having a downstream end, a catalytic converter chamber having an upstream end communicating with the downstream end of said combustion chamber and also having a downstream end, a catalytic converter at the downstream end of said catalytic converter chamber disposed so that the heated air-gas mixture is caused to flow from the combustion chamber into the catalytic converter chamber and through said catalytic converter, a mixing chamber in said housing on the outlet side of the catalytic converter, said burner bypass chamber communicating at its opposite end with said mixing chamber so that the return air in the burner bypass chamber is mixed in the mixing chamber with the gases from the combustion chamber after being directed through the catalytic converter, said mixing chamber being connected to the oven through said hot air outlet, said combustion chamber having spaced apart side walls extending upwardly from said return air duct and also having generally vertically extending, upstream and downstream end walls at opposite ends of the side walls, a generally U-shaped baffle in said combustion chamber having a bottom wall and upright side walls, said baffle extending between and to the opposite end walls of the combustion chamber, the side walls of said baffle being spaced laterally inwardly from the side walls of the combustion chamber, the communication between the downstream end of the combustion chamber and the upstream end of the catalytic converter chamber being defined by an opening in the downstream end wall of the combustion chamber disposed between the side walls of the baffle and above the bottom wall thereof.

8. The combination called for in claim 7 wherein said burner is located generally centrally within said combustion chamber at the upstream end thereof and is adapted to discharge combustion gases axially through the opening between the combustion chamber and the catalytic converter chamber, the bottom wall of said baffle being disposed below said axial path of said combustion gases and the side walls of said baffle being disposed laterally outwardly from the axial flow path of said combustion gases.

9. The combination called for in claim 8 wherein the upper edges of the side walls of said baffle are inclined upwardly from the upstream end wall of the combustion chamber to the downstream end wall of the combustion chamber at an angle such that all of the return air flows generally to the same length of travel from said return air duct to said catalytic converter chamber.

10. The combination called for in claim 9 wherein the bottom wall of said baffle is generally V-shaped.

* * * * *